US007958037B2

(12) United States Patent
Drew et al.

(10) Patent No.: US 7,958,037 B2
(45) Date of Patent: Jun. 7, 2011

(54) METHOD AND APPARATUS FOR PRODUCT SELECTION

(75) Inventors: Julie W. Drew, Redwood City, CA (US); Qi Feng, Richardson, TX (US); Bin Zhang, Freemont, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1746 days.

(21) Appl. No.: 11/087,791

(22) Filed: Mar. 23, 2005

(65) Prior Publication Data
US 2006/0218062 A1 Sep. 28, 2006

(51) Int. Cl.
*G06Q 40/00* (2006.01)
(52) U.S. Cl. ...................................... 705/36 R
(58) Field of Classification Search .................... 705/37, 705/36 T, 36 R, 35, 10, 1; 707/100
See application file for complete search history.

(56) References Cited

U.S. PATENT DOCUMENTS

| | | | | |
|---|---|---|---|---|
| 5,291,394 | A | * | 3/1994 | Chapman ........................... 705/8 |
| 6,233,493 | B1 | * | 5/2001 | Cherneff et al. ................ 700/95 |
| 7,213,007 | B2 | * | 5/2007 | Grichnik ......................... 706/21 |
| 7,280,973 | B1 | * | 10/2007 | Hack et al. ......................... 705/7 |

OTHER PUBLICATIONS

Lawler, Eugene, "Combinatorial Optimization Networks and Matroids", 1976, pp. 122-128.
Balinski, M. L., "On a Selection Problem," Management Science, vol. 17, No. 3, Nov. 1970, pp. 230-231.
Hochbaum, D. S., "Selection, Provisioning, Shared Fixed Costs, Maximum Closure, and Implications on Algorithmic Methods Today," Management Science, vol. 50, No. 6, Mar. 14, 2004. pp. 709-723.
Gallo, G. et al., "A Fast Parametric Maximum Flow Algorithm and Applications," SIAM Journal of Computing, vol. 18, No. 1, Feb. 1989, pp. 30-55.
Hochbaum, D. S., "The Pseudoflow Algorithm and the Presduoflow based Simplex for the Maximum Flow Problem," Proceedings of Integer Programming and Combinatorial Optimization 6th Intl. IPCO Conference, Houston, Texas, Jun. 1998, pp. 325-337.
Ravindra, K. K. et al., "Improved Algorithms for Bipartite Network flow," SIAM Journal on Computing vol. 23, No. 5, Oct. 1994, pp. 906-933.
Rhys, J.M.W., "A Selection Problem of Shared Fixed Costs and Network Flows," Management Science, vol. 17, No. 3, Nov. 1970, 8 pp.
Hochbaum, D. S., "Economically Preferred Facilities Locations with Networking Effect," University of California, Berkeley, Feb. 14, 2005, pp. 1-26.

* cited by examiner

*Primary Examiner* — Kelly Campen

(57) ABSTRACT

A method for determining a total benefit derived from a subset of products in a product portfolio includes identifying a set of customer orders having a set of ordered products from the product portfolio and an order benefit and selecting the subset of products from the product portfolio. The method also totals the order benefits from the set of customer orders whose set of ordered products are included within the subset of products from the product portfolio. An apparatus is provided for use in determining a total benefit derived from a subset of products in a product portfolio.

18 Claims, 3 Drawing Sheets

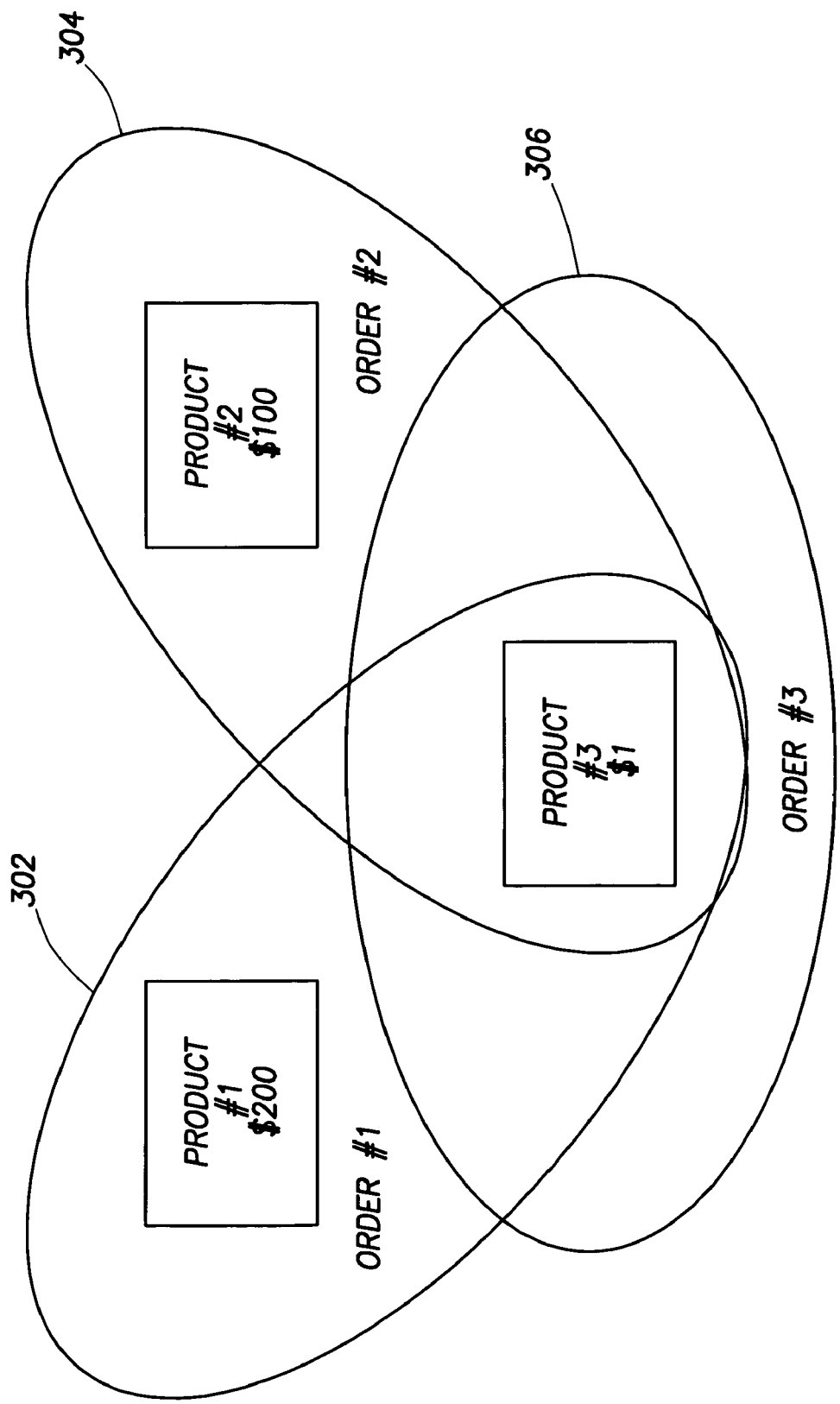

METHOD AND APPARATUS FOR PRODUCT SELECTION

BACKGROUND

Product proliferation is a concern for many business enterprises because making or selling numerous products adds to inventory and management costs. Further, a business enterprise may lose sales as a result of consumer confusion stemming from numerous product choices. In today's fast paced business climate, businesses attempt to monitor the financial success of the products that are offered for sale. Businesses strive to select a particular product portfolio for sale to customers that increase the business' profit.

BRIEF DESCRIPTION OF THE DRAWINGS

For a detailed description of exemplary embodiments of the invention, reference will now be made to the accompanying drawings in which:

FIG. 3 shows order information in accordance with an embodiment of the invention.

NOTATION AND NOMENCLATURE

Figure 1:
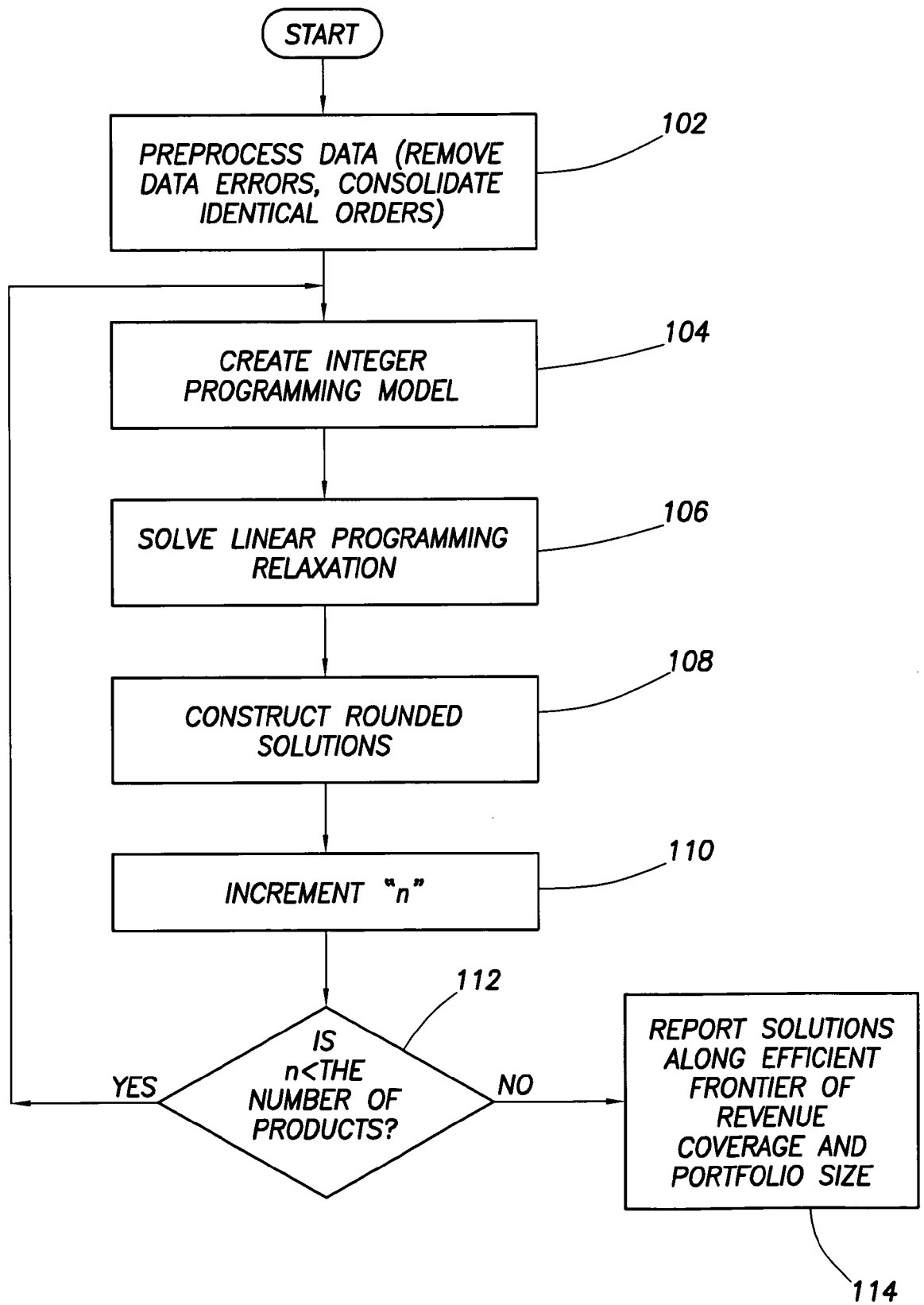
FIG. 1 shows a flowchart highlighting a method for product portfolio selection in accordance with an embodiment of the invention.

Certain term(s) are used throughout the following description and claims to refer to particular system components. As one skilled in the art will appreciate, different companies/industries may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" or "couples" is intended to mean either an indirect or direct electrical connection. Thus, if a first device couples to a second device, that connection may be through a direct electrical connection, or through an indirect electrical connection via other devices and connections.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

In accordance with various embodiment of the invention, methods and apparatuses are described that reduce the number of products included in a product portfolio to a set of products that is expected to cover most order revenue. The disclosed approach helps reduce the costs associated with managing a product offering without substantially sacrificing the variety that customers may desire and the associated revenue from customer demand.

As an illustrative example, in the personal computer (PC) business, a customer's order may comprise a particular set of products such as a chassis, processor, memory card, graphics card, monitor, mouse, keyboard and power cable. An order is said to be "covered" by a product set if every product in the order is included in the set. A method is described for selecting a set of at most n products to offer for sale to maximize the revenue of orders that are covered by the product set for a range of product sets of different sizes. The method generates a plurality of product portfolios along an efficient frontier of revenue coverage and set size.

To better describe embodiments of the invention, some mathematical notation is first presented. Because it is desirable to find a set of products of a size of at most "n" that maximizes the revenue of orders covered, as a first step, the problem can be formulated as an integer program model (denoted by IP(n)) by defining decision variables, constraints and an objective function as follows for IP(n):

Decision Variables

Let $X_p=1$ if product "p" is included in the product portfolio, otherwise $X_p=0$.

Let $Y_o=1$ if order "o" is covered by the portfolio, otherwise $Y_o=0$.

Constraints

Order o is not covered unless each product p in the order is included: $Y_o \leq X_p$ for each product-order combination (o,p).

At most n products are included: $\Sigma_p X_p \leq n$.

X and Y variables are binary: $X_p \epsilon \{0,1\}, Y_o \epsilon \{0,1\}$.

Objective Function

Maximize the total revenue of orders covered by the product portfolio: $\Sigma_o R_o Y_o$.

X and Y comprise vectors that represent products and orders respectively. Solving the above integer program model can be mathematically intensive. For typical data sets involving hundreds of thousands of product-order combinations, the integer program model has hundreds of thousands of constraints, and may take an undesirably long time to solve, or in some cases, may not be solvable at all. The third constraint, which requires the $X_p$, $Y_o$ variables to have binary values (e.g., 0 and 1), is what makes the integer program model problem difficult to solve.

In accordance with an embodiment of the invention, the requirement that the $X_p$, $Y_o$ variables comprise binary values is relaxed, and is replaced with a requirement that permits $X_p$, $Y_o$ to be continuous variables with values in a particular range such as in the interval of 0 to 1. This latter requirement in which $X_p$, $Y_o$ comprise values in a particular range transforms the problem into a linear program which can be solved faster than the integer program model above. This linear program is referred to as the "linear programming relaxation" of the original integer program model and is denote by LPR(n).

Some notation used for LPR(n) include:

Decision Variables $X_p$ determines if product "p" is to be included in the product portfolio, product "p" is included in the product portfolio if it is a certain value after rounding.

$Y_o$ determines if order "o" is covered by the product portfolio, order "o" is covered by the product portfolio is it is a certain value after rounding.

Constraints

Order o is not covered unless each product p in the order is included: $Y_o \leq X_p$ for each product-order combination (o,p).

At most n products are included: $\Sigma_p X_p \leq n$.

X and Y variables are between zero and 1: $0 \leq X_p \leq 1$ and $0 \leq Y_o \leq 1$.

Objective Function

Maximize the total revenue of orders covered: $\Sigma_o R_o Y_o$.

For general integer programming problems, the solution to the linear programming relaxation is of little practical use because the variables have fractional values, and do not correspond to decisions that can be implemented. For example, in the case of the linear programming relaxation, a particular product may have a solution in which $X_p=\frac{1}{2}$, which means that product p is "halfway" included in the portfolio, a meaningless and impractical result. However, in the case of the linear programming relaxation, LPR(n), it can be used to create two useful solutions by rounding.

Assuming $X=(X_p)$ and $Y=(Y_o)$ is a solution to LPR(n), two new solutions from X, Y can be generated by rounding up and rounding down. More specifically, $X^D$, $Y^D$ are the vectors obtained by rounding each fractional element of the X and Y vectors down to the nearest smaller integer value, while, $n_D$, is the number of elements of the $X^D$ vector that are equal to 1. Thus, $n_D$ corresponds to the number of products in the portfolio described by $X^D$. Similarly, $X^U$, $Y^U$ are obtained by rounding up each fractional element of the X and Y vectors to the nearest greater integer value; and letting $n_U$ be the corresponding number of products. By construction, $n_D \leq n \leq n_U$. Accordingly, the solution X, Y could be an integer solution to LPR(n). In that case, the rounded down and rounded up solutions coincide and thus $n_D=n_U$.

A result of one embodiment of the invention is that the portfolio described by $X^D$, $Y^D$ is optimal for IP($n_D$), and the portfolio $X^U$, $Y^U$ is optimal for IP ($n_u$). Thus, by solving the linear programming relaxation LPR(n), at least one and up to two optimal solutions for the integer programs IP($n_D$) and IP($n_u$) are obtained. By solving a series of linear programming relaxations for several values of n, solutions for the integer program for several values of n are also obtained. In doing so, a series of solutions along an efficient frontier of revenue coverage versus portfolio size can be generated. Although this series may not provide an integer solution for every possible value of n, in practice, the integer solutions provided are sufficient. One property of the series of solutions generated by the method described herein is that the series of solutions are nested. In other words, for m<n, the optimal product portfolio for IP(m) is a subset of the optimal product portfolio for IP(n).

Referring to FIG. 1, there is shown a flowchart of a method in accordance with an embodiment of the invention. The method takes as an input, historical order data that includes each order and each product contained in each such order, as well as the order revenue data. In 102, the data is preprocessed in which data errors are removed and identical orders are consolidated. The data errors that are removed comprise errors such as orders having incorrect product numbers, etc.

In 104, the integer programming model is generated where the decision variable Xp is set equal to 1 if a product p is selected or, otherwise, set equal to 0. Likewise, variable Yo is set equal to 1 if order o is covered by the order or, otherwise set equal to 0. In 104, the constraints used for the integer programming model are also set. The constraints include setting order o to be not covered unless each product p in the order is covered ($Y_o \leq X_p$). Also, the constraints include providing at most n products ($\Sigma_p X_p \leq n$) and the X and Y variables being binary: $X_p \in \{0,1\}, Y_o \in \{0,1\}$. In accordance with at least some embodiments, the objective of the integer programming model is to maximize or substantially maximize the total revenue of orders covered ($\Sigma_o R_o Y_o$), although maximizing other types of benefits (e.g., order profit, order margin or other metrics associated with individual orders) may also be desirable.

In 106, a solution to the integer program of 104 is solved where the constraints $X_p \in \{0,1\}, Y_o \in \{0,1\}$, are replaced with the boundary constraints $0 \leq X_p \leq 1$ and $0 \leq Y_o \leq 1$. In 108, the X and Y values constitute the solution to the linear programming relaxation in 106. $X^D$, $Y^D$ are the vectors obtained by rounding each fractional element of the X and Y vectors down to the nearest integer value and $n_D$ is the number of products in the portfolio corresponding to $X^D$, $Y^D$. Similarly, $X^U$, $Y^U$ are obtained by rounding up each fractional element of the X and Y vectors to the nearest integer value and $n_U$ is the corresponding number of products. The solutions $X^D$, $Y^D$ and $X^U$, $Y^U$ are recorded. The X and Y values may be integers and thus, as explained above, may coincide at the same solution. The product portfolio described by $X^D$, $Y^D$ is optimal for IP($n_D$) and the product portfolio described by $X^U$, $Y^U$ is optimal for IP($n_u$).

In 110, n is incremented by letting $n=n_U+\Delta$, where $\Delta$ is the desired granularity of the solution curve and can be chosen as desired. In decision step 112, if n is less than the number of products, the method loops back to 104. Otherwise. the routine moves to 114 where the solutions are reported. The output of the method may comprise a chart of the efficient frontier of revenue coverage and portfolio size, and a nested series of portfolios corresponding to the points along that curve.

The approach described herein, referred to as Revenue Coverage Optimization (RCO), results in less products required to achieve different revenue coverage levels than might otherwise have been the case. The use of fewer products in the product portfolio leads to less inventory carrying costs and other associated costs.

Figure 2:
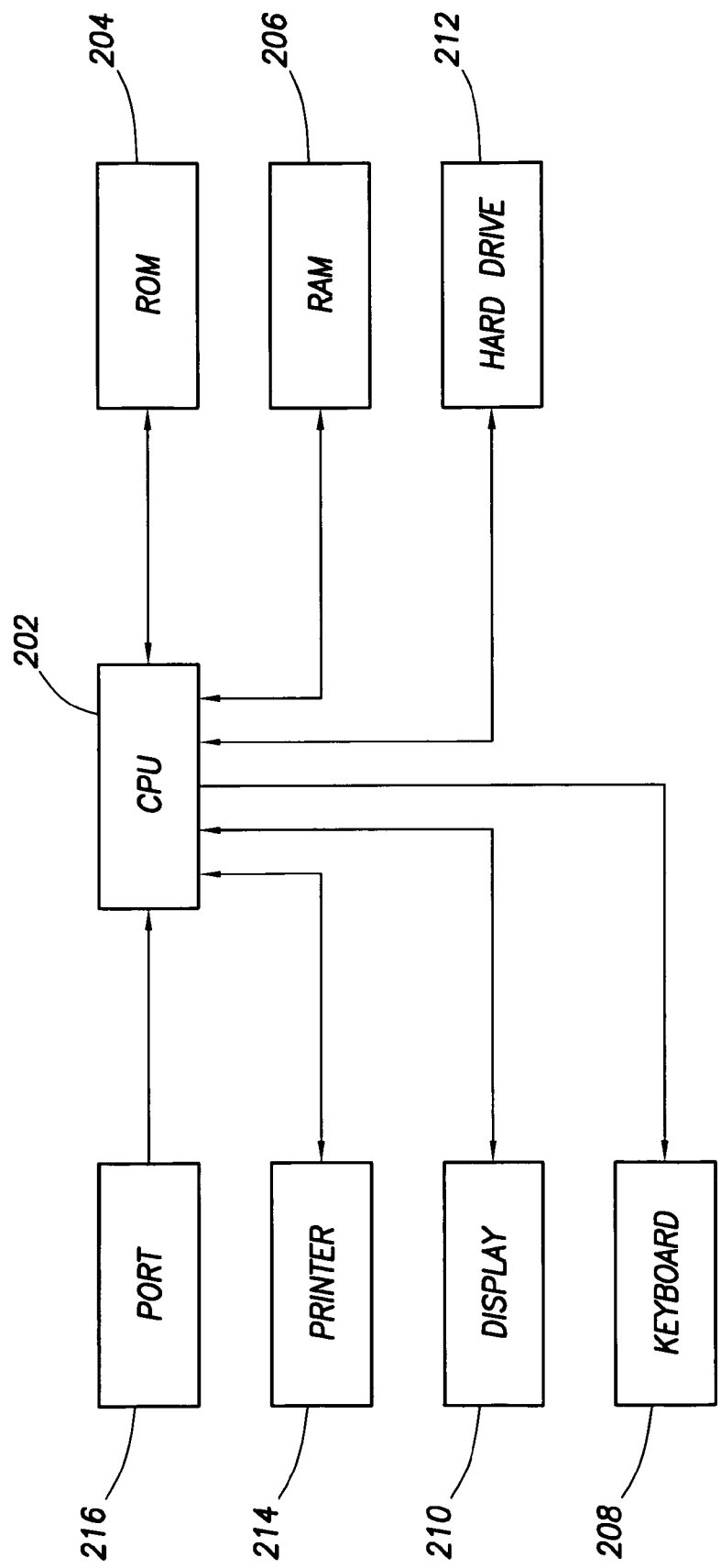
FIG. 2 shows a computer system in accordance with an embodiment of the invention.

Referring now to FIG. 2, there is shown a computer system that can implement the method described above. The computer system 200 includes a central processing unit (CPU) 202, Read Only Memory (ROM) 204, Random Access Memory (RAM) 206, keyboard 208 for inputting information, display 210, non-volatile storage 212 (e.g., a hard drive), and a printer 214. The method described herein can be embodied in executable code stored on, for example, the hard drive 212. The computer system 200 allows the revenue coverage optimization executable code to be executed on the CPU 202 with the results being stored on the hard drive 212 or other storage location. Historical product order data and order revenue data that are used in determining the products for the product portfolio can be received by input/output (I/O) port 216. Port 216 can comprise an Ethernet, serial, parallel, or any other type of port. The port 216 receives the product order data and the order revenue data can be stored in servers or other data storage devices that are coupled via a network, such as a local area network (not shown) to computer system 200. The results can also be shown graphically on display 210 and/or printed using printer 214. The computer system 200 can be coupled to other computer systems via port 216. Results from computer system 200 can be sent to other systems (e.g., server, etc.) via the port 216 and results stored at a remote site.

When comparing the product selection technique of the present invention with product ranking according to revenue generation, it has been found when looking at actual order data, that the number of products in a product portfolio that are required to achieve certain levels of revenue coverage is less than when ranking products by using the prior art revenue generation technique (see discussion of FIG. 3 below).

As an illustrative example, when a sample study of real order data was used to compare both approaches, the approach described herein referred to as Revenue Coverage Optimization (RCO) resulted in less products selected for the product portfolio to achieve different revenue coverage levels as compared to when using the prior art revenue contribution product ranking (Simple Ranking) as shown in Table 1 below.

TABLE 1

| Revenue Coverage | RCO (# products) | Simple Ranking (# products) |
|---|---|---|
| At 70% Revenue Coverage | 116 | 132 |
| At 80% Revenue Coverage | 152 | 173 |
| At 90% Revenue Coverage | 223 | 326 |
| At 92% Revenue Coverage | 266 | 371 |
| At 94% Revenue Coverage | 290 | 440 |

As shown in Table 1, the RCO technique yields lower number of products at different revenue coverage levels, providing for lower inventory carrying costs, etc.

Referring to FIG. 3, there is shown order information including three orders. Order 302 includes products #1 and #3, order 304 includes products #2 and #3, and order 3 includes product #3. Product #1 has revenue generation of $200, product #2 has revenue generation of $100 and product #3 has revenue generation of $1. If a product portfolio were selected based on revenue generation, product #1 would be chosen first, followed by product #2 and then by product #3. However, if product #3 which is a very low revenue generating product that is found in all three orders 302-306 is excluded from the product portfolio offering, it could be possible that none of the order revenue could have been realized given that it is part of all the orders.

Using the RCO technique of the present invention, the ranking of products for the product portfolio for the illustrated scenario would yield a ranked selection of product #3, product #1 and product #2 in that order. Thus, if only two products could be selected for the product portfolio, product #3 and product #1 would be selected using one embodiment of the present invention.

While it has been described how to apply embodiments of the invention to achieve efficient revenue coverage versus product portfolio size, the results generalize to other objectives. Instead of increasing or maximizing order revenue, the same method can be applied to increase or maximize order profit, number of orders, or any other metric/benefit associated with individual orders. The constraints can be based on portfolio size, portfolio cost, or any other metric associated with individual products. These generalizations affect the input data requirements. Moreover, other aspects of the invention are flexible enough to accommodate strategic business constraints such as forced inclusion or exclusion of products. One can simply introduce a constraint into the integer and linear programs enforcing the inclusion/exclusion of one or more desired/undesired product(s) in the portfolio.

The above discussion is meant to be illustrative of the principles and various embodiments of the present invention. Numerous variations and modifications will become apparent to those skilled in the art. It is intended that the following claims be interpreted to embrace all such variations and modifications.

What is claimed is:

1. A method executed by a computer for determining a total benefit derived from a subset of products in a product portfolio, comprising:
identifying, by the computer, a set of customer orders, having a set of ordered products from the product portfolio and corresponding order benefits;
selecting, by the computer, the subset of products from the product portfolio; and
totaling, by the computer, the order benefits from the customer orders whose ordered products are included within the subset of products from the product portfolio.

2. A method as defined in claim 1, further comprising:
specifying an upper limit to a number of products in the subset of products.

3. A method as defined in claim 1, wherein the benefit is achieving a predetermined revenue level.

4. A method as defined in claim 1, wherein the subset of products includes a fractional number of products.

5. A method as defined in claim 4, further comprising:
rounding the fractional number of products up to a higher number of products.

6. A method as defined in claim 4, further comprising:
rounding the fractional number of products down to a lower number of products.

7. A method as defined in claim 1, wherein the subset of products include an integer number of products.

8. The method of claim 1, further comprising:
formulating a problem of selecting the subset of products as an integer program model that includes an objective function of maximizing total order benefit of customer orders covered by the product portfolio.

9. The method of claim 8, further comprising performing linear programming relaxation of the integer program model and solving the linear programming relaxation of the integer program model to select the subset of products.

10. The method of claim 1, further comprising:
calculating a first total order benefit attributed to a first subset of products selected from the product portfolio;
calculating a second total order benefit attributed to a second subset of products selected from the product portfolio,
wherein the selected subset of products is the first subset of products if the first total order benefit is greater than the second total order benefit.

11. A computer for use in determining a total benefit derived from a subset of products in a product portfolio, comprising:
means for identifying a set of customer orders, having a set of ordered products from the product portfolio and corresponding order benefits;
means for selecting the subset of products from the product portfolio; and
means for totaling the order benefits from the customer orders whose ordered products are included within the subset of products from the product portfolio, wherein totaling the order benefits produces the total benefit derived from the subset of products.

12. A computer as defined in claim 11, further comprising:
means for specifying an upper limit to a number of products in the subset of products.

13. A computer as defined in claim 11, wherein the subset of products includes a fractional number of products and further comprising:
means for rounding the fractional number of products up to a higher number of products.

14. A computer as defined in claim 11, wherein the subset of products includes a fractional number of products and further comprising:
means for rounding the fractional number of products down to a lower number of products.

15. A computer for use in determining a total benefit derived from a subset of products in a product portfolio, comprising:
a processor; and
computer code executable on the processor to:

identify a set of customer orders, having a set of ordered products from the product portfolio and corresponding order benefits;
select the subset of products from the product portfolio; and
total the order benefits from the customer orders whose ordered products are included within the subset of products from the product portfolio.

16. The computer of claim 15, wherein the computer code is executable to further:
formulate a problem of selecting the subset of products as an integer program model that includes an objective function of maximizing total order benefit of customer orders covered by the product portfolio.

17. The computer of claim 16, wherein the computer code is executable to further:
perform linear programming relaxation of the integer program model and solve the linear programming relaxation of the integer program model to select the subset of products.

18. The computer of claim 15, wherein the computer code is executable to further:
calculate a first total order benefit attributed to a first subset of products selected from the product portfolio;
calculate a second total order benefit attributed to a second subset of products selected from the product portfolio,
wherein the selected subset of products is the first subset of products if the first total order benefit is greater than the second total order benefit.

* * * * *